United States Patent
Zhang et al.

(10) Patent No.: US 10,989,689 B2
(45) Date of Patent: Apr. 27, 2021

(54) GAS CHROMATOGRAPHY-ION MOBILITY SPECTROMETRY DETECTOR AND GAS CHROMATOGRAPH-ION MOBILITY SPECTROMETER

(71) Applicants: Nuctech Company Limited, Beijing (CN); TSINGHUA UNIVERSITY, Beijing (CN)

(72) Inventors: Qingjun Zhang, Beijing (CN); Weiping Zhu, Beijing (CN); Yuanjing Li, Beijing (CN); Zhiqiang Chen, Beijing (CN); Ziran Zhao, Beijing (CN); Yinong Liu, Beijing (CN); Yaohong Liu, Beijing (CN); Qiufeng Ma, Beijing (CN); Ge Li, Beijing (CN); Biao Cao, Beijing (CN); Nan Bai, Beijing (CN)

(73) Assignee: NUCTECH COMPANY LIMITED, Beijing (CN)

( * ) Notice: Subject to any disclaimer, the term of this patent is extended or adjusted under 35 U.S.C. 154(b) by 0 days.

(21) Appl. No.: 16/235,315

(22) Filed: Dec. 28, 2018

(65) Prior Publication Data
US 2019/0204270 A1    Jul. 4, 2019

(30) Foreign Application Priority Data

Dec. 29, 2017  (CN) .......................... 201711479224.5

(51) Int. Cl.
*G01N 27/62*  (2021.01)
*G01N 27/622*  (2021.01)
(Continued)

(52) U.S. Cl.
CPC ........... *G01N 27/622* (2013.01); *G01N 30/20* (2013.01); *G01N 30/6026* (2013.01);
(Continued)

(58) Field of Classification Search
CPC .. G01N 27/622; G01N 30/20; G01N 30/6026; G01N 2030/025
See application file for complete search history.

(56) References Cited

U.S. PATENT DOCUMENTS

| 5,021,654 A * | 6/1991 | Campbell ............ G01N 27/622 250/281 |
| 5,227,628 A * | 7/1993 | Turner ................. G01N 27/622 250/282 |

(Continued)

FOREIGN PATENT DOCUMENTS

| CN | 106645472 A | 5/2017 |
| CN | 107907622 A | 4/2018 |

(Continued)

OTHER PUBLICATIONS

British Search Report dated Jun. 27, 2019 received in British Application No. 1821243.1.
(Continued)

*Primary Examiner* — Eliza W Osenbaugh-Stewart
(74) *Attorney, Agent, or Firm* — Scully Scott Murphy & Presser

(57) ABSTRACT

A gas chromatography-ion mobility spectrometry detector and a hyphenated apparatus, the gas chromatography-ion mobility spectrometry detector comprises a gas chromatography mechanism and an ion mobility spectrometry mechanism. The gas chromatography mechanism comprises a chromatographic column and a sample injection port. The ion mobility spectrometry mechanism comprises a mobility tube and a connecting body, while a metal connection plate of the connecting body comprises a chromatographic metal plate, an ion mobility metal plate and a semipermeable membrane; on the ion mobility metal plate there are provided an ion mobility sample and carrier gas inlet, an ion mobility sample chamber and a sample injection port; the chromatography sample chamber and the ion mobility sample chamber are separated by semipermeable membrane.

8 Claims, 4 Drawing Sheets

(51) Int. Cl.
*G01N 30/72* (2006.01)
*G01N 30/20* (2006.01)
*G01N 30/60* (2006.01)
*G01N 30/02* (2006.01)

(52) U.S. Cl.
CPC ......... *G01N 30/7206* (2013.01); *G01N 30/72* (2013.01); *G01N 2030/025* (2013.01)

(56) References Cited

U.S. PATENT DOCUMENTS

2008/0155946 A1  7/2008  Wang et al.
2015/0115152 A1* 4/2015  Zhang ................ G01N 30/7206
                                              250/288

FOREIGN PATENT DOCUMENTS

| CN | 207816917 U | | 9/2018 | |
| CN | 109307724 A | | 2/2019 | |
| WO | WO-2016-107486 | * | 7/2016 | ............. G01N 27/62 |

OTHER PUBLICATIONS

Canadian Office Action dated Nov. 18, 2019 received from the Canadian Patent Office in application CA 3,028,464.

* cited by examiner

GAS CHROMATOGRAPHY-ION MOBILITY SPECTROMETRY DETECTOR AND GAS CHROMATOGRAPH-ION MOBILITY SPECTROMETER

CROSS-REFERENCE TO RELATED APPLICATIONS

The present application is based on and claims priority of Chinese Application No. 201711479224.5, filed on Dec. 29, 2017, entire contents of which is hereby incorporated by reference.

TECHNICAL FIELD

The present disclosure relates to the field of analysis and detection technique, and particularly relates to (GC-IMS).

BACKGROUND

An ion mobility spectrometer (IMS) has characteristics of simple structure, high sensitivity, high rate of analysis, etc., and thus they are widely used for detection of chemical war materials, narcotic drugs, explosives or environmental monitoring, and so on. However, when IMS is used alone as a detecting instrument to detect a sample with complicated components, they have the following problems: (1) the existing commercial IMS has a resolution ratio of 40 or so, due to the matter of manufacturing technique, so that it is hard to distinguish those substances having similar immigration rates; (2) the ions of some compounds will annihilate each other with complex reaction; (3) IMS has a low dynamic range, when one or more compounds have a very large concentration, the formation of ions of other compounds will be affected, resulting in an omission. For the above reasons, when an IMS is used to detect a sample with complicated components, omission and misdiagnosis are more likely to occur.

A gas chromatograph is currently universally recognized separation tools with high efficiency and high stability, and they have wide range of applications in compartment analysis of gas phase substance. However, different detectors have different selectivity and sensitivity for substance, while even some detectors (such as electron capture detector (ECD) and hydrogen flame detector) are not universal detector; moreover, as a universal detector, a thermal conductivity detector may not have a sensitivity that can completely meet the requirement of detection limit for many substances.

The gas chromatograph-ion mobility spectrometer (GC-IMS) technique not only effectively utilizes the GC's prominent separation ability for complicated sample, but also effectively utilizes the characteristics of high sensitivity of the IMS detector as well as wide selectivity to substance under the dual mode (positive & negative), such technique can greatly improve both the detection accuracy and the detection sensitivity of a mixture (compound). Consequently, the hyphenated techniques get enough attention and rapid development in the field of analysis and detection.

However, in the existing GC-IMS technique, the connection manner between GC and IMS may be selected only from the following manner: inserting the chromatographic column directly at the front end of the ionization zone of IMS, or inserting the chromatographic column directly into the ionization zone of IMS, or inserting the chromatographic column into the reaction zone of IMS. These connection manners are usually simple and easy to operate. However, such connection manners on one hand will produce pollution within the mobility tube during long term use of the instrument, which is hard to clean/remove, and, on the other hand, since the reactive ion in an IMS positive mode is mainly $H^+(H_2O)_n$ the reactive ion in a negative mode is mainly $O_2^-(H_2O)_n$, while as GC carrier gas, high purity nitrogen continuously enters into IMS will also affect the ionization environment of IMS, results in complicated component of reactive ions in a positive mode, and reactive ions are difficult to produce in a negative mode, and so on, all of these factors go against the long term stability and popularization of GC-IMS.

SUMMARY

One main object of the present disclosure is to overcome at least one deficiency of the prior art, a gas chromatography-ion mobility spectrometry detector and a hyphenated apparatus are provided to address the problem that the pollution produced within the mobility tube during a long term use of the existing instrument is hard to clean/remove.

For this purpose, the present disclosure provides a gas chromatography-ion mobility spectrometry detector which comprises a gas chromatography mechanism and an ion mobility spectrometry mechanism.

The gas chromatography mechanism comprises a chromatographic column and a sample injection port, the sample injection port is positioned at an end of the chromatographic column and is communicated with the chromatographic column.

The ion mobility spectrometry mechanism comprises a mobility tube and a connecting body, the connecting body is arranged between the chromatographic column and the mobility tube and communicated therewith, the connecting body comprises a metal connection plate, the metal connection plate comprises a chromatographic metal plate and an ion mobility metal plate arranged corresponding, as well as a semipermeable membrane between the chromatographic metal plate and the ion mobility metal plate, the chromatographic metal plate is provided with a chromatography sample and carrier gas inlet, a chromatography sample chamber and a chromatography waste gas outlet, the chromatography sample and carrier gas inlet is communicated with the chromatographic column and the chromatography sample chamber; on the ion mobility metal plate being provided with an ion mobility sample and carrier gas inlet, an ion mobility sample chamber and a sample injection port communicated with each other, while the sample injection port being communicated with the mobility tube; the chromatography sample chamber and the ion mobility sample chamber are separated by the semipermeable membrane.

Wherein the sample molecules enter into the chromatographic column via the sample injection port under the action of the chromatography sample and carrier gas for pre-separation, and the pre-separated sample molecules enter into the chromatography sample chamber via the chromatography sample and carrier gas inlet, in which a part of the sample molecules can permeate through the semipermeable membrane into the ion mobility sample chamber and further into the mobility tube via the sample injection port, while the other part of the sample molecules and all of the chromatography carrier gas are discharged via the chromatography waste gas outlet.

The present disclosure also provide a gas chromatograph-ion mobility spectrometer, comprising a gas path system and a gas chromatography-ion mobility spectrometry detector as described above, wherein the gas path system comprises a chromatography gas path, a first mobility gas path and a second mobility gas path, the chromatography gas path is communicated with the sample injection port, the chromatography sample and carrier gas can enters into the chromatographic column via the chromatography gas path and the sample injection port, a part of the sample molecules can permeate into the ion mobility sample chamber through the semipermeable membrane; one end of the first mobility gas path is communicated with the mobility tube; the second mobility gas path being communicated with the mobility tube for supporting mobility gas to the mobility tube; the mobility tube discharging gas discharged from the mobility tube can enter into the ion mobility tube via the first mobility gas path, the second mobility gas path and the ion mobility sample and carrier gas inlet, and the sample permeated from the chromatography sample chamber into the ion mobility sample chamber can enter into the mobility tube via the sample injection port, under the action of the mobility sample and carrier gas, and is ionized, and then reach a Faraday plate under the action of a mobility electric field to be detected.

The beneficial technical effect provided by the present disclosure, in comparison with the prior art, is that the middle portion of the connecting body of the disclosure is provided as a metal connection plate, and within the metal connection plate is provided a semipermeable membrane, the semipermeable membrane only allows a part of sample being separated through the gas chromatography mechanism to enter into the ion mobility spectrometry mechanism to be detected, while the high purity carrier gas is blocked outside from the semipermeable membrane, which not only ensures that the independent ionization environment of the ion mobility spectrometry mechanism remains unaffected, but also can greatly simplify the cleaning of the ion mobility spectrometry detector part during a long term use of the, gas chromatography-ion mobility spectrometry detector; in addition, a chromatography waste gas outlet is provided at the rear end of the metal connection plate, which can thereby prevent some poisonous samples from being discharged directly and thus harming the personnel and environment. Also, the problem that the pollution produced within the mobility tube during long term use of the existing instrument is hard to clean/remove can be addressed effectively.

BRIEF DESCRIPTION OF THE DRAWINGS

The above-mentioned, various of objects, characteristics and advantages of the present disclosure will become more appearance with reference to the following detailed description of preferable embodiments, in conjunction with the following drawings. While these drawings are merely exemplary illustrations of the disclosure, which are not necessarily drawn to scale, and that the same reference numbers presented in the drawing always denote the same or similar components. In which.

DETAILED DESCRIPTION

Figure 1:
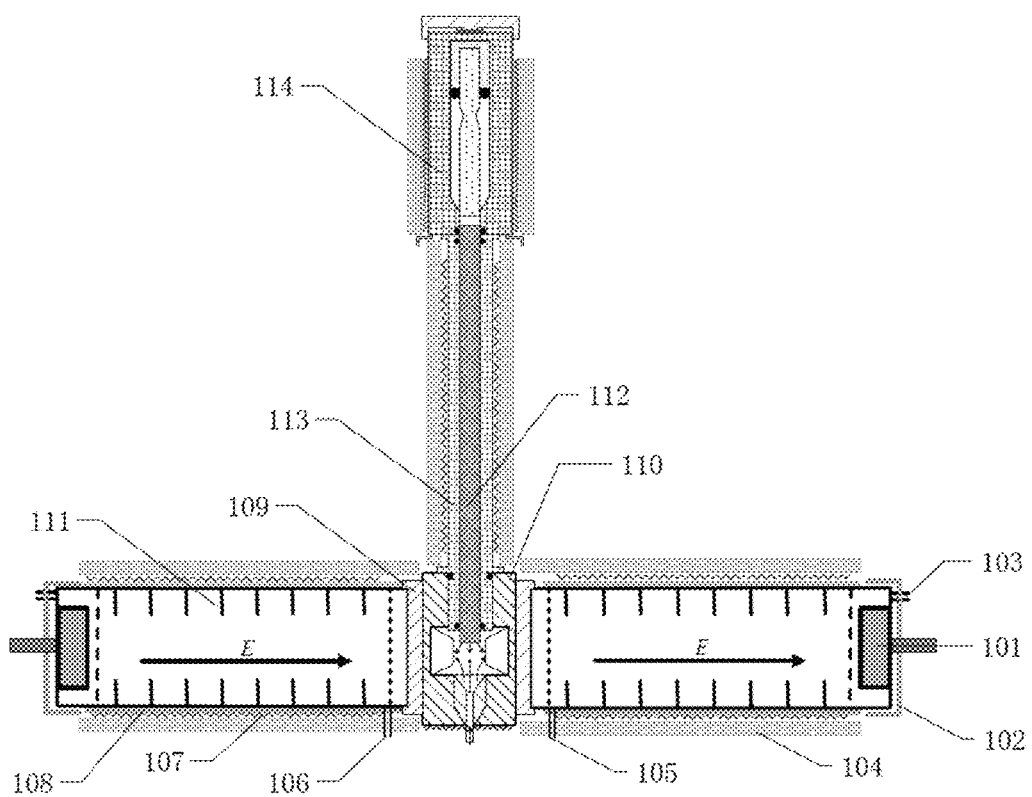
FIG. 1 is a structural schematic diagram of a gas chromatograph-ion mobility spectrometer according to the present disclosure.

Exemplary embodiments will now be described more fully with reference to the accompanying drawings. However, the example embodiments can be implemented in a variety of forms, and should not be construed as being limited to the examples set forth herein; instead, these embodiments are provided to make the present disclosure more comprehensive and complete, with fully conveying the conception of the exemplary embodiments to those skilled in the art. The same reference numbers in the drawing denote the same or similar structure, and the detailed description thereof is hereby omitted.

In the present embodiments those terms for (position) relativity, such as "lower" or "bottom", and "upper" or "top", may be used to describe a relationship of one illustrated component to another. It would be understood that if the arrangement as illustrated is turned upside down, the component which is described as being on "lower" side will become the component being on "upper" side. Moreover, when a certain layer is indicated as "above/on" another layer or baseplate, it may mean that the layer is provided on another layer or baseplate directly, or mean that the layer is on another layer or baseplate, or mean that other layer(s) is interposed between another layer or baseplate.

Figure 2:
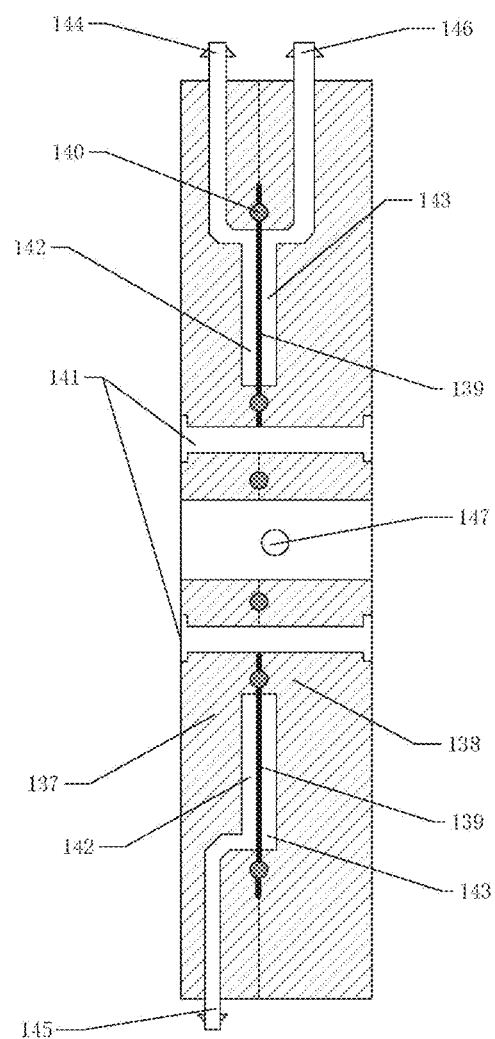
FIG. 2 is a structural schematic diagram of a metal connection plate of the gas chromatograph-ion mobility spectrometer according to the disclosure.

The present disclosure provides a gas chromatography-ion mobility spectrometry detector 100 and a gas chromatograph-ion mobility spectrometer including the detector. As shown by FIGS. 1, 2, the gas chromatography-ion mobility spectrometry detector 100 comprises a gas chromatography mechanism and an ion mobility spectrometry mechanism.

The gas chromatography mechanism comprises a chromatographic column 112 and a sample injection port 114, the sample injection port 14 is positioned at one end of the chromatographic column 12 and is communicated with the chromatographic column 112.

The ion mobility spectrometry mechanism comprises a mobility tube 111 and a connecting body, the connecting body is provided and communicated between the chromatographic column 112 and the mobility tube 111, the connecting body comprises a metal connection plate 110; the metal connection plate 110 comprises a chromatographic metal plate 137 and an ion mobility metal plate 138 provided correspondingly, and a semipermeable membrane 139 provided between the chromatographic metal plate 137 and the ion mobility metal plate 138, the chromatographic metal plate 137 is provided with a chromatography sample and carrier gas inlet 144, a chromatography sample chamber 142 and a chromatography waste gas outlet 145, the chromatography sample and carrier gas inlet 144 is communicated with the chromatographic column 112 and the chromatography sample chamber 142; on the ion mobility metal plate 138 is provided an ion mobility sample and carrier gas inlet 146, an ion mobility sample chamber 143 and a sample injection port 147 communicated with each other, and the sample injection port 147 is communicated with and the mobility tube 111; the chromatography sample chamber 142 and the ion mobility sample chamber 143 are separated by the semipermeable membrane 139.

Wherein the sample molecules enters into the chromatographic column 112 via the sample injection port 114 under the action of the chromatography sample and carrier gas for pre-separation, and the pre-separated sample molecules enter into the chromatography sample chamber 142 via the chromatography sample and carrier gas inlet 144, a part of the sample molecules can permeate through the semipermeable membrane 139 into the ion mobility sample chamber 143 and enter into the mobility tube 111 via the sample injection port 147, while the other part of the sample molecules and all of the chromatography carrier gas are then discharged via the chromatography waste gas outlet 145.

The middle portion of the connecting body of the disclosure is provided as the metal connection plate 110, and within the metal connection plate 110 is provided the semipermeable membrane 139, the semipermeable membrane 139 only allows a part of sample being separated through the gas chromatography mechanism to enter into the ion mobility spectrometry mechanism to be detected, while the high-purity carrier gas is blocked outside from semipermeable membrane 139, which not only ensures that the independent ionization environment of the ion mobility spectrometry mechanism remains unaffected, but also can greatly simplify the cleaning of the ion mobility spectrometry detector during a long term use of the ion mobility spectrometry detector 100; in addition, a chromatography waste gas outlet 145 is provided at the rear end of the metal connection plate 110, which can be communicated with a sample absorption equipment that can be made up by active carbon and molecular sieve, so that some poisonous samples can thereby be prevented from being discharged directly and thus harming the personnel and environment. Also, the problem that the pollution produced within the mobility tube during long term use of the existing instrument is hard to clean/remove can be solved effectively.

In the present embodiment, the sample injection port 114 is configured to have a branch or not.

The chromatographic column 112 can be a capillary chromatographic column or a cluster capillary column (MCC), the present disclosure is illustrated by example of a MCC column. The gas chromatography mechanism further comprises a chromatography column sleeve 113, for protecting the chromatographic column 112 and heating the chromatographic column 112, and the chromatographic column sleeve 113 keeps the connection between the chromatographic column 112 and the sample injection port 114 and between the chromatographic column 112 and the mobility tube 111 in seal.

The chromatographic metal plate 137, the ion mobility metal plate 138 and the semipermeable membrane 139 are sealing-fixed by using an O-sealing ring 140 and a combination screw 141, the semipermeable membrane 139 may partition the chromatography sample chamber 142 and the ion mobility sample chamber 143 into two independently sealed annular cavities.

In the present embodiment, a heating film 107 encloses at those portions that need to be heated, such as the sample injection port 114, the chromatographic column sleeve 113 and the mobility tube 111, etc., and an insulation cotton 104 encloses the outside of the heating film 107. An aluminum case 108 with an inner wall applied with heat resisting, high-isolate glue is used between the mobility tube 111 and the heating film 107 for shielding, in order to prevent the heating film 107 and the external electromagnetic fields or the like from affecting the mobility tube 111 signal. And, on the outside of the Faraday plate 101 a metal plate 102 is used for shielding, in order to improve the capacity of resisting disturbance of a Faraday plate 101.

The present disclosure further provides a gas chromatograph-ion mobility spectrometer comprising a gas path system and the gas chromatography-ion mobility spectrometry detector 100 described above, the specific configuration and operation method thereof will be interpreted hereinafter.

Figure 3:
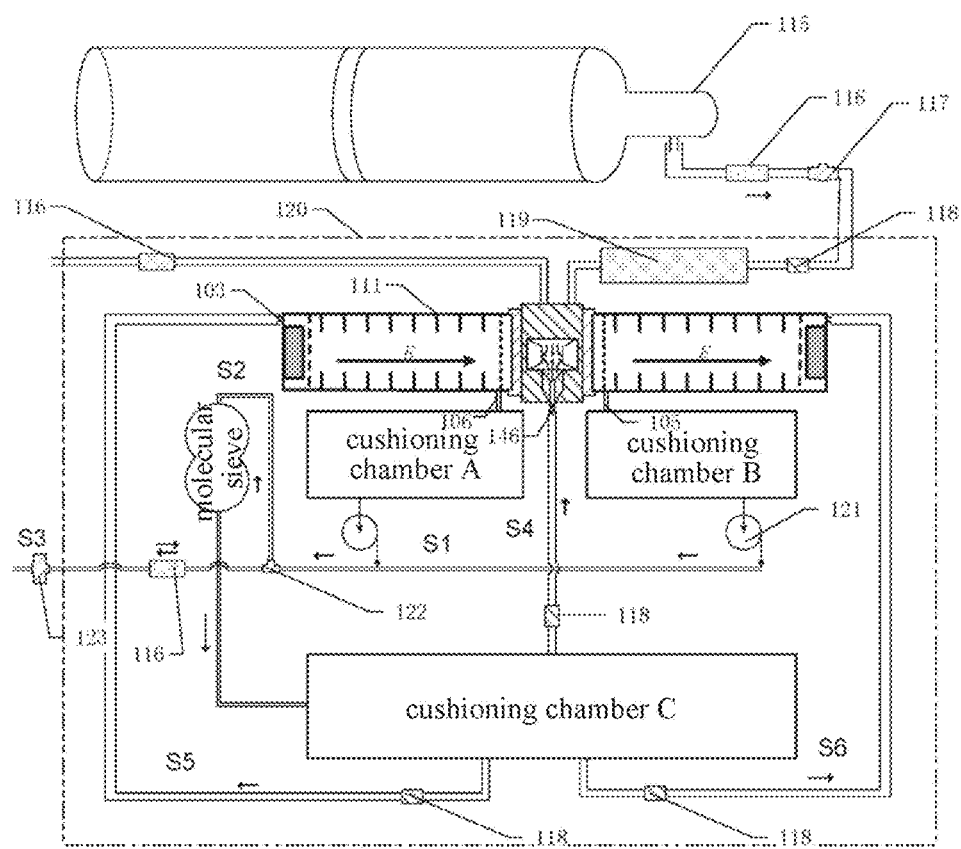
FIG. 3 is a schematic diagram of a gas path system of a gas chromatograph-ion mobility spectrometer according to the disclosure.
Figure 4:
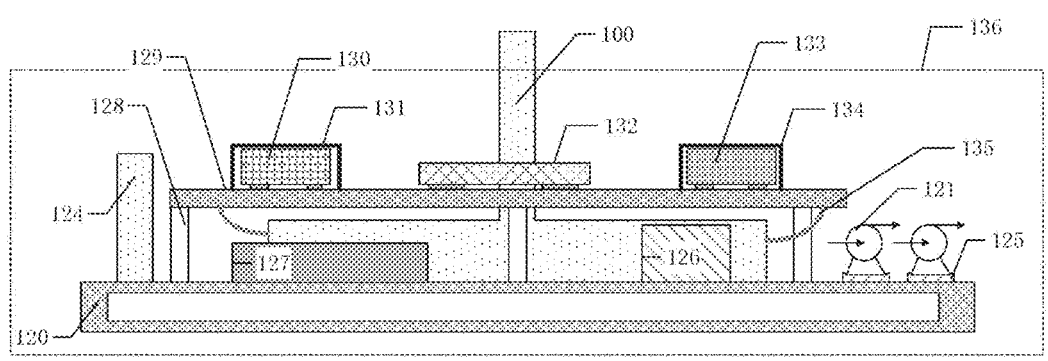
FIG. 4 is a front view of the whole machine, wherein a gas chromatograph-ion mobility spectrometer according to the disclosure is supported by a cushioning bottom plate.

As shown in FIG. 3, the gas path system comprises a chromatography gas path, a first mobility gas path and a second mobility gas path, the chromatography gas path is communicated with the sample injection port 114, the chromatography sample and carrier gas can enter into the chromatographic column 112 via the chromatography gas path and the sample injection port 114, a part of the sample molecules can permeate into the ion mobility sample chamber 143 through the semipermeable membrane 139; one end of the first mobility gas path is communicated with the mobility tube 111; the second mobility gas path is communicated with the mobility tube 111 for providing mobility gas to the mobility tube 111; the discharging gas discharged from the mobility tube 111 can enter into the ion mobility tube via the first mobility gas path, the second mobility gas path and the ion mobility sample and carrier gas inlet 146, and the sample permeated from the chromatography sample chamber into the ion mobility sample chamber may enter into the mobility tube 111 via the sample injection port 147, under the action of the ion mobility sample and carrier gas, and is ionized, and then reach a Faraday plate under the action of a mobility electric field to be detected.

Wherein the chromatography gas path comprises a filter 116, a combination valve 117 and a flow controller 118, the chromatography sample and carrier gas can enter into the sample injection port 114 via the filter 116, the combination valve 117 and the flow controller 118.

Preferably, the mobility tube 111 is an integrated ceramic the mobility tube, and can be designed as a single-mode mobility tube having a single detection mode, or as a dual tube having two (positive and negative) detection modes, according to need. In the present disclosure, the mobility tube 111 comprises a positive mode tube, a negative mode tube, a positive discharging gas port 106 and a negative discharging gas port 105, the positive mode tube and the negative mode tube are communicated via a connecting body, the positive discharging gas port 106 is communicated with the positive mode tube, and the negative discharging gas port 106 is communicated with the negative mode tube.

Meanwhile, in order to ensure the insulation between the positive and negative modes of the mobility tube 111 and reduce the mutual interference, the connecting body further comprises heat resisting insulation plates 109 provided on both sides of the metal connection plate, made by using a compact material with heat resistance, good insulation and small dilatation coefficient, such as PTFE, PEEK, ceramics and so on, the metal connection plate 110 can be made by stainless steel and the metal connection plate 110 is grounded.

The gas path system further comprises a cushioning bottom plate 120, the cushioning bottom plate 120 comprises cushioning chambers A, B, the cushioning chamber A is connected between the positive discharging gas port 106 and the first mobility gas path, and the cushioning chamber B is connected between the negative discharging gas port 105 and the first mobility gas path.

Wherein the cushioning bottom plate 120 can be made following the same technique as that in the prior patent CN 106645472A, which can not only effectively reduce the pulse gas current when a diaphragm pump valve is operating, as well as the impact of instrument vibration on the internal gas current of the mobility tube 111, but also be beneficial to installing debug and maintenance, and the repetitive description will be omitted herein.

The first mobility gas path may comprise a first branch S1, a second branch S2 and a third branch S3 connected by a T-connector 122, the mobility tube discharging gas coming from the cushioning chambers A, B converge at the first branch S1, the second branch S2 is provided with a molecular sieve 124, and is communicated with the ion mobility sample and carrier gas inlet 146, while a purifier 116 and a microfiltration membrane 123 are arranged in the third branch S3, a part of the mobility tube discharging gas coming from the first branch S1 enters into the second branch S2, and the other part of the mobility tube discharging gas enters into the third branch S3.

The cushioning bottom plate 120 further comprises a cushioning chamber C, the first mobility gas path further comprises a fourth branch S4, and the second branch S2 is connected with the cushioning chamber C, the fourth branch S4 communicates the cushioning chamber C with the ion mobility sample and carrier gas inlet 146, and a flow controller 118 is arranged in the fourth branch S4.

The second mobility gas path comprises a positive mode branch S5 and a negative mode branch S6, the positive mode branch S5 is connected between the cushioning chamber C and the positive mode tube, and the negative mode branch S6 is connected between the cushioning chamber C and the negative mode tube.

When the instrument is working, the chromatography sample and carrier gas is fed by a gas source 115 and passes through the filter 116 in the tube to remove impurities, such as carbureted hydrogen, oxygen gas and water, from the high purity gas, and then enters into the instrument gas path through a combination valve 117 fixed on the outer wall of the casing. Wherein when the combination valve 117 is formed by two one-way sealing valves, the dual head spools of the two one-way sealing valves are pushed to be open as the two one-way sealing valves are connected, and the combination valve 117 forms a passageway; while the two one-way sealing valves are each closed when they are disconnected from each other. Wherein a flow controller 118 is used at a front end of the sample injection port 114 of the instrument to regulate the chromatography sample and carrier gas, and the regulated chromatography sample and carrier gas, after being preheated, enters into a vaporizing chamber from the chromatography carrier gas inlet of the sample injection port 114 and brings the sample to be detected in the vaporizing chamber into the chromatographic column 112 for pre-separation (in FIG. 3 the reference number 119 denotes gas chromatography mechanism); then the sample after MCC pre-separation enters into the chromatography sample chamber 142 from the chromatography sample and carrier gas inlet 144 of the chromatography metal connection plate 137 of the middle connecting bod, and permeates through semipermeable membrane 139 into the ion mobility sample chamber 143, and then the sample, under the action of ion mobility sample and carrier gas, passes through a sample injection port 147, an ionization area, a reaction area, an ion gate, and reach a Faraday plate under the action of mobility electric field to be detected. While those samples that fail to timely permeate into the ion mobility sample chamber 143 will flow together with the chromatography carrier gas from the chromatography sample chamber 142 via the chromatography waste gas outlet 145, and after being adsorbed by the filter 116, and be discharged from the exhaust pipe.

Such a method of using the semipermeable membrane 139 to separate the chromatography from the ion mobility spectrometry, on one hand, may ensure that an ionization environment of the ion mobility is free of being affected by the chromatography carrier gas; and, on the other hand, the cleaning work of ion mobility detector part would be simplified as well.

In the gas path connection, the cushioning bottom plate 120 is made by duralumin and has three independent sealing cavities, that is, the cushioning chamber A, the cushioning chamber B and the cushioning chamber C as mentioned above.

The discharging gas port 105 of negative mode is connected with the cushioning chamber B and then is connected with a gas pumping port the diaphragm pump 121; the discharging gas port 106 of positive mode is connected with the cushioning chamber C and then is connected with a gas pumping port of the diaphragm pump 121. The positive/negative modes discharging gases are converged at the T-connector 122, One of the other two passages of the T-connector 122 is connected with an ion mobility cleaning molecular sieve 124, and the other one is connected with the purifier 116, at the terminal end of the purifier 116 is provided a microfiltration membrane 123. Wherein the passage connected with the purifier 116 is used for balancing the gas pressure. The passage connected with the ion mobility cleaning molecular sieve 124 is used for cleaning the ion mobility recycle gas, the recycle gas is cleaned by the molecular sieve 124 and, after entering into the cushioning chamber C, is divided into three sections and communicated with the mobility gas ports 103 of the positive and negative mode mobility tubes 111 respectively, by the control of the flow controller 118, to form a mobility gas, and is communicated with the ion mobility sample and carrier gas inlet 146 on the ion mobility metal plate 138 to form an ion mobility sample and carrier gas, the ion mobility sample and carrier gas introduces the sample that has permeated the semipermeable membrane 139 and entered into the ion mobility sample chamber 143 from the sample injection port 147, into the mobility tube 111 for an ionization analysis.

The gas chromatography-ion mobility spectrometry hyphenated apparatus further comprises an electric circuit, the electric circuit comprises a power module 127, a mainboard 129, a preamplifier module 133, a positive voltage module 130, a heating module and a control module 132, said mainboard 129 is used, on one hand, for connecting the mobility tube 111 outgoing cable (a Faraday plate signal line and a mobility tube 111 positive voltage lead), and on the other hand for providing quick slot(s) for the preamplifier module, the positive voltage module, the control panel or the like, to facilitate the fixation, replacement and maintenance of each module; the power module 127 is used for converting a direct current (DC) into an alternating current (AC), and for supplying a constant working voltage to the mainboard.

In order to reduce the vibration caused by the operating of the diaphragm pump 121, a damping pad 125 and a damping bolt is used for the connection of the diaphragm pump 121 and the cushioning bottom plate 120. An AC supply voltage after being converted into a DC low voltage by the power module 127 can supply a constant DC working voltage to the mainboard 129, the control module 132, the positive voltage module 130 and the preamplifier module 134.

The positive voltage module 131 is used for supplying hopping pulses to an ion gate, as well as supplying a stable electric field for a mobility area and a grid-plate (between a suppression grid and a Faraday plate), the preamplifier module 134 is used for shaping, filtering and amplifying the signal received by the Faraday plate; the control module 132 is used to achieve modification and control of heating and heat preservation, start-up and shutdown of the instrument, and other working parameters. The heating module is used for heating a structure of GC-IMS operating in a high temperature condition; and the control module is used for achieve modification and control of heating, start-up and shutdown of the instrument, and other working parameters.

A fixing leg 128 is used for fixing the mainboard 129 onto the cushioning bottom plate 120. The mainboard 129 is used for providing quick slot(s) for the positive voltage, the preamplifier, the central control or the like; and also used for introducing the positive voltage required to operate the mobility tube 111 into the mobility tube electrode and for transmitting a Faraday plate signal to the preamplifier module for shaping filtering and amplifying, and so on. Wherein in order to prevent a disturbance of positive voltage to the signal and prevent the Faraday plate signal from being disturbed during transmission, the positive voltage lead between the mainboard and the mobility tube 111 electrode and the lead line between the Faraday plate signal and the mainboard each use a shield coaxial cables 135.

Meanwhile, the positive voltage module 130, the preamplifier module each also use a positive voltage shielding case 131, a preamplifier shielding case 134 for shielding, the mobility tube 111 is enclosed by the mobility tube 111 shielding aluminum sheet 108, the shielding cable and the shielding case can effectively reduce an external electromagnetic interference to the mobility tube 111 and the electric circuit, so that the detector system can work effectively over a long period.

Wherein the shielding shell described above comprises a mobility tube 111 heating shielding shell, a Faraday plate shielding cylinder, an mobility tube 111 integral shielding shell and a positive voltage and preamplifier shielding shell, and so on, a multilayer of metal shielding can effectively reduce the interference from the outside world and the GC-IMS inner electric circuit to the mobility tube 111 in collecting or outputting signal, the shielding of electric circuit may reduce an external electromagnetic to the working stability of the electric circuit, so that the mobility tube 111 module can work effectively over a long period.

The cushion cavity provided by the cushioning bottom plate 120 can effectively eliminate the gas pulse of the diaphragm pump 12, and can achieve an independent control to the positive/negative mode mobility gas and the discharging gas; on the other hand, the cushioning bottom plate 120 also provide fast port(s) for the gas path connection of the molecular sieve 124 and the gas chromatography-ion mobility spectrometry detector 100 or the like, which facilitates the replacement of the molecular sieve and the connection of gas path.

At the same time, the gas chromatography-ion mobility spectrometry detector 100, the molecular sieve 124, the power module 127, the heating module 126, the gas pump dumping pad (cushion) 125 and the mainboard 129 or the like are all fixed on the cushioning bottom plate 120, such that the system can be made as a whole module, when in maintenance and installation the cushioning bottom plate 120 can be fully brought from the instrument shell 136, or can be loaded into the instrument shell 136 after installation and debugging, which not only facilitates the assembly, maintenance and replacement of the detector in the casing, but also renders the detector a nice anti-vibration effect and shielding effect.

In conclusion, the present disclosure provides a hyphenated interface method of GC-IMS hyphenated technique and an apparatus thereof, which can not only greatly facilitate the interconnection between the chromatography and ion mobility spectrometry instruments, the maintenance of GC-IMS, the cleaning of mobility tube, but also ensure a stable ionization environment for ion mobility free of being affect, so that the use and maintenance of the GC-IMS can be more convenient and the performance thereof is thereby more stable.

Although the disclosure has been described with reference to several representative embodiments, it can be understood that the terminologies used herein are merely illustrative and exemplary terminologies, without limitative ones. As the disclosure can be implemented in variety of forms without departing from the spirit or essence of the disclosure, it is to be understood that those embodiments mentioned above are not intended to be limited to the aforementioned, detailed description, and should be interpreted broadly within the spirit and scope of the claims attached herewith. Therefore, all of the variations falling within the scope of the claims or their equivalents shall be covered by the attached claims.

What is claimed is:

1. A gas chromatograph-ion mobility spectrometer, comprising a gas path system, a gas chromatography mechanism and an ion mobility spectrometry mechanism, wherein
   the gas chromatography mechanism comprises a chromatographic column and a sample injection port, and the sample injection port is positioned at one end of the chromatographic column and communicated with the chromatographic column;
   the ion mobility spectrometry mechanism comprises a mobility tube and a connecting body, the connecting body is provided and communicated between the chromatographic column and the mobility tube, and the connecting body is provided with an ion mobility sample and carrier gas inlet, and a sample injection port communicated with each other; and
   the gas path system comprises a chromatography gas path, a first mobility gas path and a second mobility gas path, the chromatography gas path is communicated with the sample injection port of the gas chromatography mechanism, a chromatography sample and carrier gas can enter into the chromatographic column via the chromatography gas path and the sample injection port, a part of sample molecules pre-separated through the chromatographic column can enter into the mobility tube; one end of the first mobility gas path is communicated with the mobility tube; the second mobility gas path is communicated with the mobility tube for supporting mobility gas to the mobility tube; mobility tube discharging gas discharged from the mobility tube can enter into the mobility tube via the first mobility gas path, the second mobility gas path and the ion mobility sample and carrier gas inlet, and the sample molecules can enter into the mobility tube via the sample injection port, under the action of the mobility sample and carrier gas, and is ionized, and then reach a Faraday plate under the action of a mobility electric field to be detected,
   wherein the first mobility gas path comprises a first branch, a second branch and a third branch connected by a T-connector, the second branch is provided a molecular sieve and is communicated with the ion mobility sample and carrier gas inlet, and the third branch is provided a purifier and a microfiltration membrane, a part of the mobility tube discharging gas coming from the first branch enters into the second branch and the other part of the mobility tube discharging gas enters into the third branch.

2. The gas chromatograph-ion mobility spectrometer according to claim 1, wherein the chromatography gas path comprises a filter, a combination valve and a flow controller, the chromatography sample and carrier gas can enter into the sample injection port via the filter, the combination valve and the flow controller.

3. The gas chromatograph-ion mobility spectrometer according to claim 1, wherein the mobility tube comprises a positive mode tube, a negative mode tube, a positive discharging gas port and a negative discharging gas port, the positive mode tube and the negative mode tube are communicated by the connecting body, the positive discharging gas port is communicated with the positive mode tube, and the negative discharging gas port is communicated with the negative mode tube; the gas path system further comprises a cushioning bottom plate, the cushioning bottom plate comprises a first cushioning chamber and a second cushioning chamber, the first cushioning chamber is connected between the positive discharging gas port and the first mobility gas path, and the second cushioning chamber is connected between the negative discharging gas port and the first mobility gas path.

4. The gas chromatograph-ion mobility spectrometer according to claim 3, wherein the mobility tube discharging gas coming from the first cushioning chamber and the second cushioning chamber is confluent at the first branch.

5. The gas chromatograph-ion mobility spectrometer according to claim 4, wherein the cushioning bottom plate further comprises a third cushioning chamber, the first mobility gas path further comprises a fourth branch, while the second branch is connected with the third cushioning chamber, the fourth branch communicates the third cushioning chamber and the ion mobility sample and carrier gas inlet, and a flow controller is provided on the fourth branch.

6. The gas chromatograph-ion mobility spectrometer according to claim 5, wherein the second mobility gas path comprises a positive mode branch and a negative mode branch, the positive mode branch is connected between the third cushioning chamber and the positive mode tube, and the negative mode branch is connected between the third cushioning chamber and the negative mode tube.

7. The gas chromatograph-ion mobility spectrometer according to claim 1, further comprising an electric circuit, the electric circuit comprising a power module, a mainboard, a preamplifier module, a positive voltage module, a heating module and a control module, the mainboard being used for connecting a mobility tube outgoing cable and for providing slots for the preamplifier module, the positive voltage module, a control board; the preamplifier module being used for shaping, filtering and amplifying a signal received by the Faraday plate; the positive voltage module being used for providing a hopping pulse to an ion gate, providing an electric field to an mobility area and to a grid-plate; the heating module being used for heating; the control module being used to modifying and controlling the heating as well as the start and stop of the gas chromatography-ion mobility spectrometer.

8. The gas chromatograph-ion mobility spectrometer according to claim 1, further comprising a shielding shell which comprises a mobility tube heating shielding shell, a Faraday plate shielding cylinder, a mobility tube integral shielding shell, and a positive voltage and preamplifier shielding shell.

* * * * *

UNITED STATES PATENT AND TRADEMARK OFFICE
CERTIFICATE OF CORRECTION

PATENT NO. : 10,989,689 B2
APPLICATION NO. : 16/235315
DATED : April 27, 2021
INVENTOR(S) : Qingjun Zhang et al.

Page 1 of 1

It is certified that error appears in the above-identified patent and that said Letters Patent is hereby corrected as shown below:

On the Title Page

Item (73), should read:
(73) Assignee: NUCTECH COMPANY LIMITED, Beijing (CN)
TSINGHUA UNIVERSITY, Beijing (CN)

Signed and Sealed this
Twenty-second Day of June, 2021

Drew Hirshfeld
*Performing the Functions and Duties of the*
*Under Secretary of Commerce for Intellectual Property and*
*Director of the United States Patent and Trademark Office*